(12) United States Patent
Hilliard

(10) Patent No.: US 6,628,383 B1
(45) Date of Patent: Sep. 30, 2003

(54) IMAGING SPECTROGRAPH FOR MULTIORDER SPECTROSCOPY

(76) Inventor: Ronnie Lewis Hilliard, 6975 S. Redhill Rd., Vail, AZ (US) 85641

( * ) Notice: Subject to any disclaimer, the term of this patent is extended or adjusted under 35 U.S.C. 154(b) by 375 days.

(21) Appl. No.: 09/691,725

(22) Filed: Oct. 18, 2000

Related U.S. Application Data

(60) Provisional application No. 60/161,166, filed on Oct. 22, 1999.

(51) Int. Cl.[7] .................................................. G01J 3/40
(52) U.S. Cl. ........................ 356/305; 356/328; 356/334
(58) Field of Search ............................... 356/305, 326, 356/328, 334

(56) References Cited

U.S. PATENT DOCUMENTS

| | | | | |
|---|---|---|---|---|
| 5,719,672 A | * | 2/1998 | Chien .......................... | 356/328 |
| 5,781,290 A | * | 7/1998 | Bittner et al. ................ | 356/326 |
| 5,815,261 A | * | 9/1998 | Brooks et al. ............... | 356/310 |
| 5,831,729 A | * | 11/1998 | Kuze ............................ | 356/305 |
| 5,880,834 A | * | 3/1999 | Chrisp ......................... | 356/305 |

OTHER PUBLICATIONS

Pfeiffer, M.J. et al., "FOCES—a fibre optics Cassegrain echelle spectrograph", Jun. 1, 1998, Editions de Physique, Astronomy & Astrophysics Supplement Series, vol. 130, No. 2, pp. 381–393.*

E. Loewen, et. al., Diffraction Grating Handbook, Bausch & Lomb, Inc. 1970.

W. G. Fastie, A Small Plane Grating Monochromator, J.O.S.A., 1952, 641–647, 42, No. 9.

A. B. Shafer, et al., Optimization of the Czerny–Turner Spectrometer, J.O.S.A., 1964, 879–887, 54, No. 7.

W. G. Fastie, Ebert Spectrometer Reflections, Physics Today, 1991, 37–43, 44, No. 1.

W. T. Welford, Stigmatic Ebert–Type Grating Mounting, J.O.S.A., 1963, 766, 53.

I. Furenlid, O. Cardona, A CCD Spectrograph with Optical Fiber Feed, P.A.S.P., 1988, 1001–1007, 100.

D. J. Schroeder, Design Considerations for Astronomical Echelle Spectrographs, P.A.S.P., 1970, 1253–1275, 82.

R. L. Hilliard et: al., A Cross–Dispersed Echelette Spectrograph and a Study of the Spectrum of the QSO 1331+170, Ap. J., 1975, 351–361, 196.

* cited by examiner

Primary Examiner—F. L. Evans
Assistant Examiner—Kara Geisel

(57) ABSTRACT

The Ebert-type mounting is modified for use as a multiorder spectrograph, by replacing the spherical primary mirror of the Ebert with a paraboloidal mirror to eliminate the astigmatism and spherical aberration of the Ebert mounting, and by replacing the Ebert's rotating plane grating, normally blazed for use in the first order, with a fixed low-blaze-angle grating blazed at a longer wavelength such that the radiation at the shorter wavelengths, for which the grating will be used, will be most efficiently dispersed into a multiplicity of higher spectral orders. In a preferred embodiment of this invention, these spectral orders are separated using a twice-through cross-dispersing prism mounted near the grating surface, with the grating and prism mounted and aligned together in a crossed-dispersion assembly that is interchangeable with other crossed-dispersion assemblies containing other grating and prism combinations.

5 Claims, 5 Drawing Sheets

IMAGING SPECTROGRAPH FOR MULTIORDER SPECTROSCOPY

This application claims the benefit of Provisional application Ser. No, 60/161,166, filed Oct. 22, 1999.

BACKGROUND OF THE INVENTION

This invention relates to a simple, efficient and economic multiorder spectrograph based upon a modified Ebert-type mounting, using a standard low-blaze-angle plane reflection grating as the multiorder dispersing element. This invention also relates to the efficient usage of the available pixels in a modern two-dimensional detector array, such as a CCD, by filling the array area with a multiorder spectral display covering wavelengths ranging from the vacuum ultraviolet to the infrared, either in their entirety or in selected wavelength segments, at medium to high spectral resolutions.

Until recent years the photographic emulsion was typically used as the recording means in spectrographs. The advantage of the emulsion was that it provided durable data storage having an enormous number of detector elements (photographic grains) at low cost. But the low quantum efficiency (QE), and the numerous problems associated with processing and measuring photographic plates, gave rise to common usage of faster and more convenient scanning spectrometers, or monochromators, using a photomultiplier (PMT) for routine spectral measurements not requiring a large number of resolution elements.

More recently, electronic detector arrays, such as CCDs, having large numbers of pixels, and QEs significantly higher over wider wavelength ranges than even PMTs, have become the detector of choice in spectroscopy. But whereas the cost of those earlier detectors was normally a small fraction of the cost of the spectrograph, modern scientific-grade CCDs are often the most expensive part of the spectrograph system. This creates a significant need for an inexpensive high-performance spectrograph designed to make most efficient use of these powerful detector arrays, while keeping the overall cost of the spectrograph system within budget.

The vast majority of spectrographs and spectrometers continue to be used to measure spectra in one spectral order, usually the first order, with order-sorting filters used as needed to block other orders. In such applications, a square detector array having a million pixels will typically measure fewer than 500 spectral resolution elements at one time (due to the images typically overlapping 2–3 pixels). This is a serious under-utilization of the available pixels in these expensive detectors.

An obvious way to greatly improve utilization of detector arrays is to fill the pixel array with a multiorder spectrum using a grating and a cross-dispersing element. This approach is based upon the fundamental characteristic of blazed gratings, that the light diffracted in the blaze direction is comprised of radiation in a plurality of spectral orders, where the central wavelength of each order is given by $\lambda_o$/m, where $\lambda_o$ is the first-order blaze wavelength and m is the spectral order. To clearly separate these orders in the image plane it is necessary to also introduce a cross-dispersing element (a prism or a second grating) to disperse this same radiation perpendicular to the first grating's dispersion. A thorough tutorial regarding the terminology, construction and theory of diffraction gratings is given in E. Loewen, et al., "Diffraction Grating Handbook, Bausch & Lomb, Inc., 1970, which is incorporated by reference as if fully set forth herein.

It is commonly assumed that multiorder spectrographs are in fact echelle spectrographs, inasmuch as essentially all multiorder spectrographs use echelle gratings. But the main purpose of echelle gratings is not that they should produce multiorder spectra, that being a necessary and often undesirable byproduct of their design. The reason and justification for using echelle gratings is the very high spectral resolution they afford as a direct result of their high blaze angles (typically 63°–76°), and the fact that angular dispersion of a reflection grating is proportional to Tan B, where B is the grating's blaze angle. Thus, the angular dispersion of an R2 (Tan 63.4°=2) echelle is 10 times, and an R4 (Tan 76°=4) echelle is 20 times that of a typical standard plane grating having a blaze angle of 11°. But very high spectral resolution is not a common requirement in spectroscopy, as verified by the fact that the relatively costly and complex echelle spectrographs comprise only a tiny fraction of the spectrographs that are in use.

A much simpler and less expensive way to perform multiorder spectroscopy for a majority of applications, where modest resolutions over a large wavelength range is the goal, is to use a cross-dispersed low-blaze-angle grating blazed at several times the longest wavelength to be studied. Such gratings, having a wide range of blaze and dispersion characteristics, are commercially available at reasonable cost A multiorder spectrograph using such a grating was reported by R. L. Hilliard, etal., "A Cross-Dispersed Echelette Spectrograph and a Study of the Spectrum of the QSO 1331+170", Ap.J., 1975, 351–361, Vol. 196.

An important requirement for any multiorder spectrograph is that the image quality over the area of the detector be comparable to or smaller than the pixel size. The spectrograph must therefore have negligible astigmatism, coma, and spherical aberration over the required field; and to avoid chromatic aberration over such a large wavelength ranges effectively requires all mirror imaging optics.

An elegant optical system uniquely meeting these requirements has its roots in the Ebert-type mounting, originally described by W. G. Fastie, "A Small Plane Grating Monochromator", J.O.S.A., 1952, 641–647, vol 42, no. 9. The popular Ebert has a single spherical mirror serving both as collimator and camera, and the plane grating is located near the sphere's focus. Although corrected for coma, the Ebert still has astigmatism and spherical aberration, which has restricted its use to that of a scanning spectrometer. But an essentially unnoticed article by W. T. Welford, "Stigmatic Ebert-Type Grating Mounting", J.O.S.A., 1963, 766, vol. 53, revealed that the images would become free of aberration if the spherical mirror of the Ebert were simply replaced by a paraboloidal mirror of the same focal length. The only previous example of anyone actually using a paraboloidal mirror in an Ebert-type mounting appears to be I. Furenlid and O. Cardona, "A CCD Spectrograph with Optical Fiber Feed", P.A.S.P., 1988, 1001–1007, vol. 100.

SUMMARY OF THE INVENTION

It is an object of the present invention to provide a simple, efficient, and economic multiorder spectrograph for use over a wavelength range from the vacuum ultraviolet to the infrared.

A further object of the invention is to provide such a spectrograph based upon the Ebert-type mounting, where the spherical collimator/camera mirror normally used therein is replaced by a paraboloidal mirror to eliminate the Ebert's astigmatism and spherical aberration, and to thereby create a spectrograph that has image quality comparable to the pixel resolution over the area of a two-dimensional electronic detector array.

A further object of the invention is to provide such a spectrograph that utilizes a low-blaze-angle reflection grating having first-order blaze so that spectra at shorter wavelengths of interest shall be most efficiently diffracted into higher spectral orders.

Another object of the invention is to provide such a spectrograph wherein a cross-dispersing element is located between the reflection grating and the paraboloidal mirror where it is used to cross disperse, and thereby separate, the grating orders perpendicular to the grating dispersion, to create a multiorder spectral, display.

It is also an object of the present invention to provide such a spectrograph that can create multiorder spectral displays for simultaneous recording of very large wavelength ranges at moderate to high resolution, using two-dimensional detector arrays having $N_p$ pixels to detect as many as $N<N_p/10$ spectral elements in a single exposure.

Another object of the invention is to mount and permanently align the grating and cross-dispersing element together in a removable and interchangeable cross-dispersion assembly which provides the dispersion characteristics needed to project a two-dimensional spectral display of a selected wavelength region and range, at a certain spectral resolution, onto a given two-dimensional electronic detector array.

A further object is to provide such a spectrograph having a specific and dedicated collimator/camera mirror and optomechanical construction, but which by use of a plurality of said crossed-dispersion assemblies, each having its own particular grating and cross disperser, can be used to provide a variety of multiorder spectral displays of selected wavelength regions, ranges, and resolutions for use with a variety of detector arrays.

Another object of the invention is to provide the option to fill the gap between the grating and prism with a fluid of index n to thus increase the effective blaze angle of the grating by a factor of approximately n.

Furthermore, it is an object of the invention to provide a spectrograph wherein its optical functions may occur in a variety of optical media, including air, other gases, a vacuum, or any other optically transparent media of index n.

The general object of the invention is to provide a simple, efficient and economic multiorder spectrograph, particularly as compared to a typical cross-dispersed echelle spectrograph, that provides a flexible means to optimally utilize the useful area, pixel resolution and wavelength sensitivity of two-dimensional electronic detector arrays, to record spectra over large wavelength ranges at moderate to high resolutions. Other objects and advantages of the present invention will become apparent from the figures and detailed description to follow.

Although this invention uses a modified Ebert-type mounting, it will be apparent to those skilled in the art that the type of modifications made herein to achieve the objects of this invention may also be applied to similarly expand the capabilities of other optical systems such as the Czerny-Turner spectrometer.

DESCRIPTION OF PREFERRED EMBODIMENTS

Figure 1:
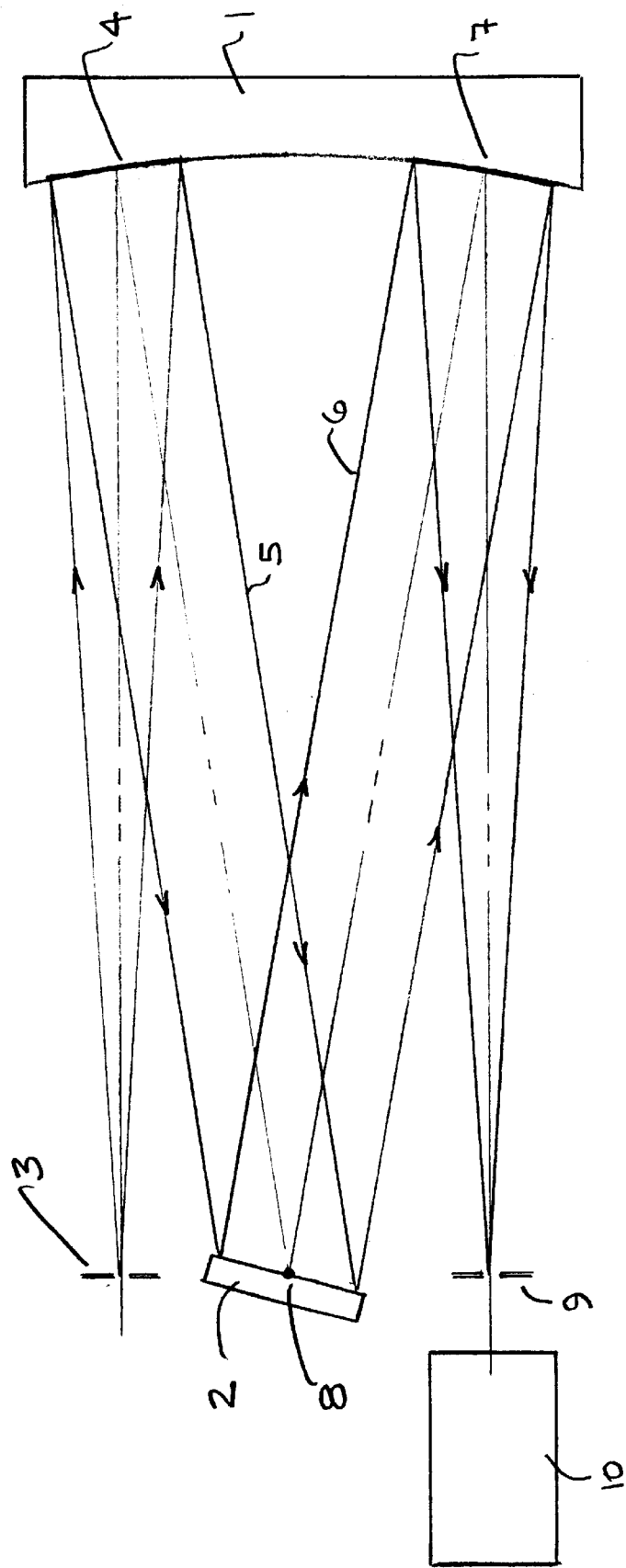
FIG. 1 is an optical diagram of the Ebert-type mounting of prior art.

A plan view of an Ebert-type mounting of prior art is shown in FIG. 1, wherein radiation is transmitted through an input aperture 3 to a first off-axis area 4 of a spherical mirror 1 having its focus near axis 8 perpendicular to the drawing, whereupon 4 collimates said radiation and reflects it as parallel beam 5 towards a plane reflection grating 2 located with its ruled surface approximately centered at and with its grooves parallel to 8, the grating being typically blazed in first order for the wavelength range in which the spectrometer will be utilized. Grating 2 reflects and disperses beam 5 into beam 6, a portion of which dispersed beam is intercepted by a second off-axis mirror segment 7 of spherical mirror 1 which is symmetrically opposite 4, wherein 7 then forms a monochromatic image of aperture 3 upon an exit aperture 9, at a wavelength determined by the tilt of grating 2 about axis 8 The exit aperture transmits said monochromatic radiation to an electronic detector such as a PMT, and a sequential point-by-point record of the spectrum is typically obtained by rotating the grating about axis 8.

Figure 2:
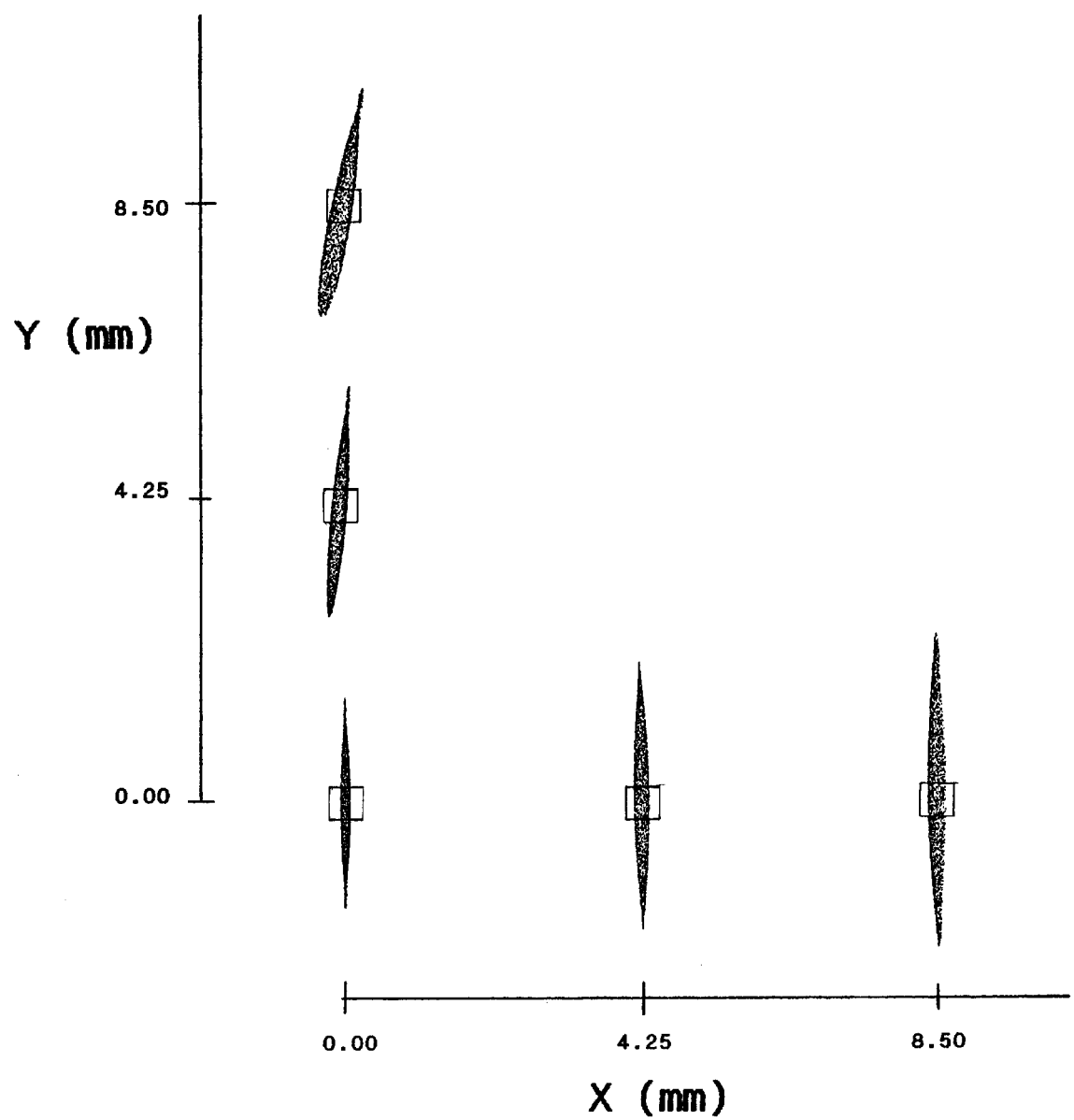
FIG. 2 are spot diagrams over a 17 mm diameter image plane for an Ebert-type mounting of prior art having a spherical collimator/camera mirror with radius of curvature of 400 mm, and an f/8 collimator beam.

As known to those skilled in the art, such use of symmetrical off-axis apertures 4 and 7 of a spherical mirror, as collimator and camera respectively of an Ebert-type mounting, results in cancellation of the coma arising from each of these off-axis spherical apertures. But the spherical aberration and astigmatism inherent to such off-axis spherical apertures is not cancelled and remains part of the image, as revealed by the spot diagrams in FIG. 2 for an Ebert-type mounting, where the spherical collimator/camera mirror has a radius of curvature of 400 mm (f=200 mm), and the collimator beam is f/8. The center of each image in FIG. 2 is enclosed for reference by a 25×25 $\mu$m (0.025 mm) square, which is comparable to the maximum pixel size normally found in electronic detector arrays used for spectroscopy. The X-axis (in mm. at the focus of 7) is along the grating dispersion, and the spot diagrams are encompassed overall by a 17 mm diameter (or 12 mm square) imaging area, which is comparable to the size of a two-dimensional electronic detector array used in spectroscopy. The images have been focused in the direction of grating dispersion (X) to maximize spectral resolution, which causes the astigmatism of the system to thus expand the images perpendicular to the dispersion (Y). The remaining width of the images in X is largely due to spherical aberration.

Figure 3:
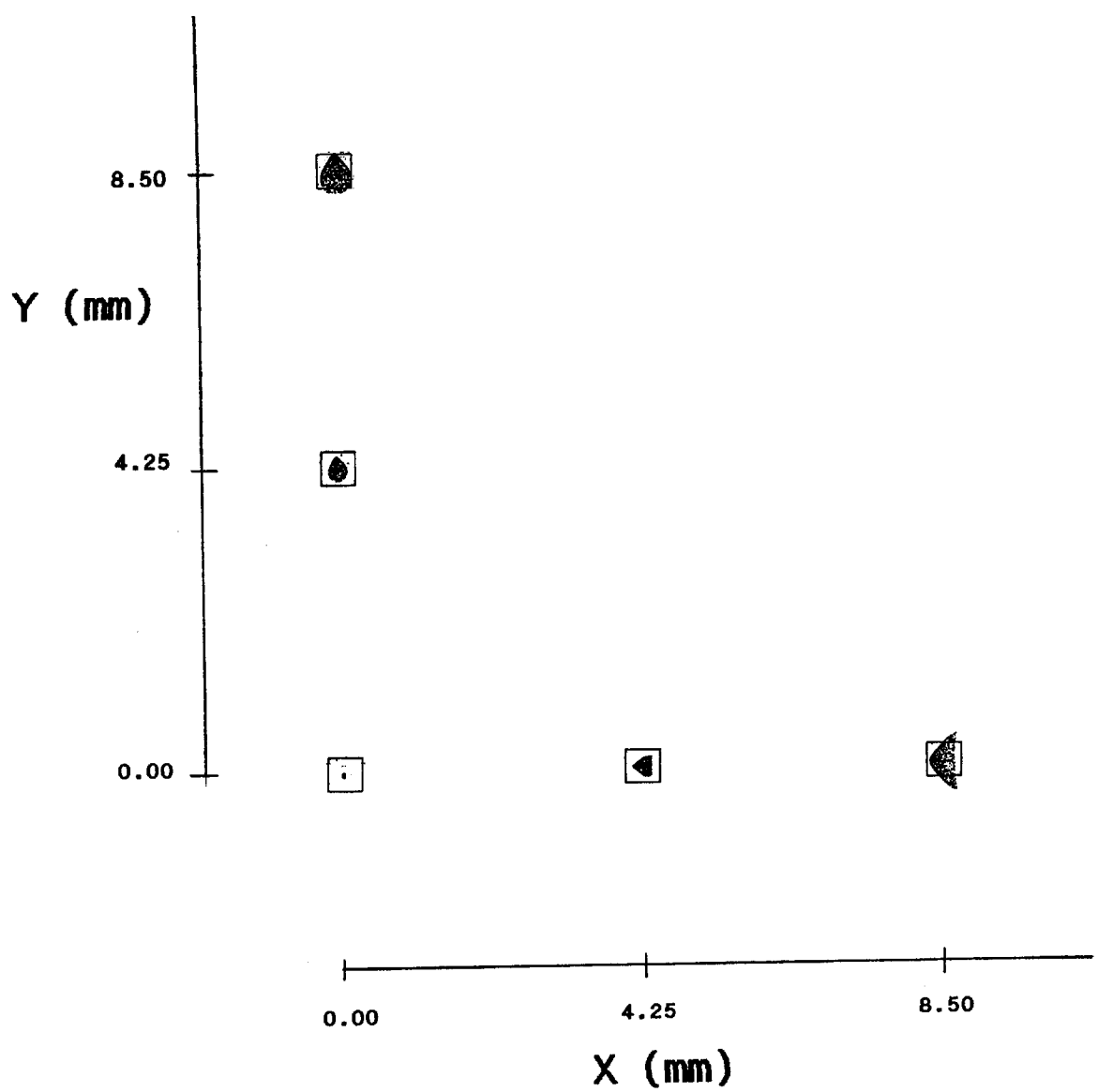
FIG. 3 are spot diagrams for a spectrograph of this invention having the same optical dimensions as in FIG. 2, wherein the collimator/camera mirror is a paraboloid.

FIG. 3 has the same format as FIG. 2, except that the spherical mirror 1 has been replaced by a paraboloidal mirror having the same focal length. The astigmatism and spherical aberration seen in FIG. 2 are now essentially absent, and the resulting images are comparable to or smaller than the 25 $\mu$m reference square over the image field.

Figure 4:
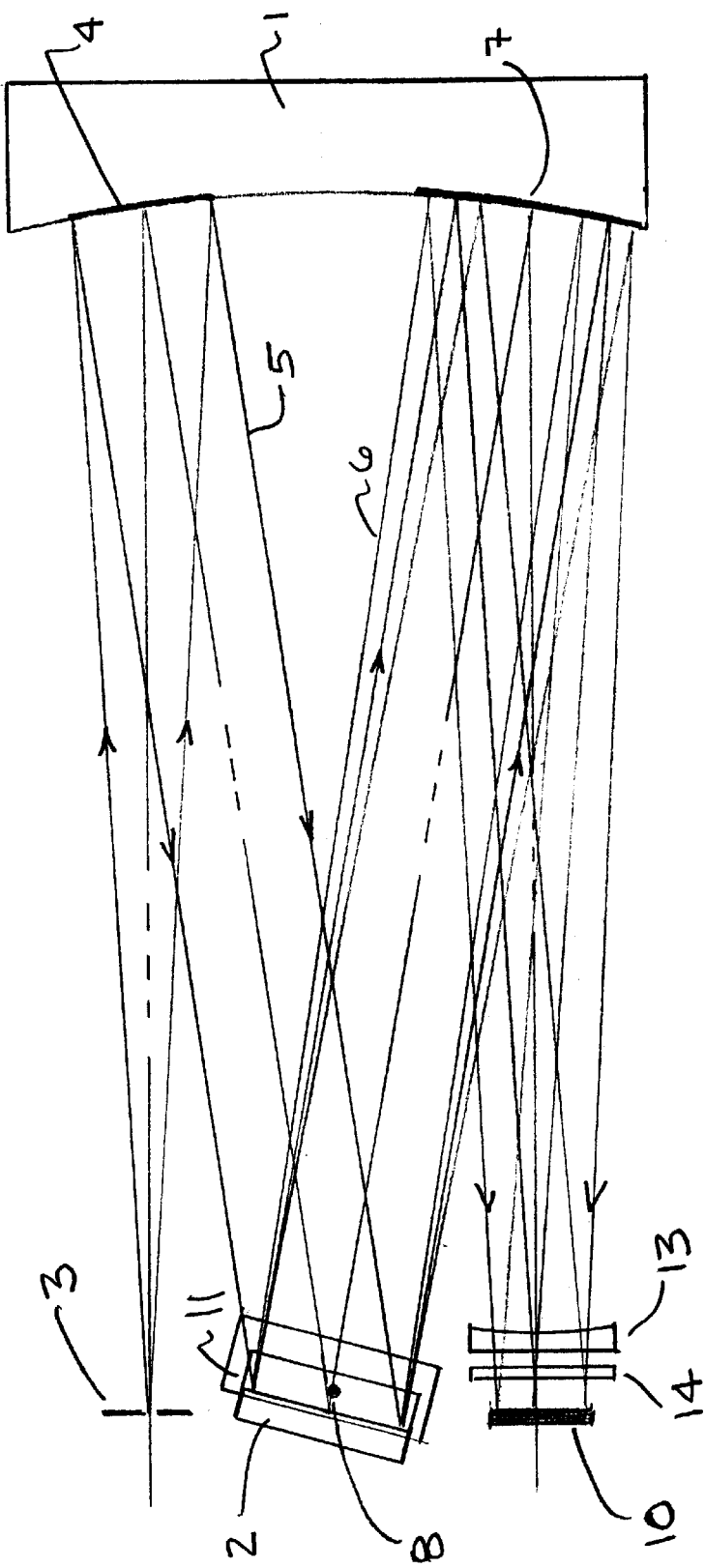
FIG. 4 is a preferred embodiment of this invention.

A preferred embodiment of this invention is shown in FIG. 4, wherein radiation is transmitted by an input aperture 3 towards a first off-axis area 4 of mirror 1, wherein 1 is a paraboloidal mirror, and where 4 is thus an off-axis paraboloid.

Area 4 reflects and collimates said radiation into a parallel beam 5 directed towards a plane reflection grating 2, which is a low-blaze-angle (typically <20°–40°) grating having its first-order blaze at a wavelength substantially longer than the wavelengths for which that grating will be utilized. Located in front of, and nearly in contact with the ruled surface of 2 is a cross-dispersing prism 11, constructed of a transparent optical material, and having first and second plane transmitting surfaces that intersect at the prism's apex, wherein said apex is nominally parallel to the grating's ruled surface and is perpendicular to the grating's grooves. Said prism is located such that the collimated radiation 5 passes through the prism towards the grating, and passes again through the prism after it has been reflected and dispersed by the grating. The prism used in this manner is known as a "twice-through" prism, wherein the resulting cross dispersion is doubled by the radiation having passed twice through the prism.

The grating and prism are together rotated and tilted as more fully explained below in FIG. 5, but for now the prism and grating are tilted such that the grating's plurality of blaze wavelengths are directed in a crossed dispersed beam 6 towards a second off-axis area 7 of mirror 1 symmetrically opposite of 4, but having an area that is larger than that of 4 to accommodate the cross-dispersed rays filling the field covered by a detector array 10 located at the focus of 7. A lens 13 may be used to correct field curvature, and may also simultaneously serve as a window 14 to seal the environment of 10, but such a lens is not required to obtain the images of the f/8 optics shown in FIG. 3, wherein the images lie on essentially a flat image plane.

Figure 5:
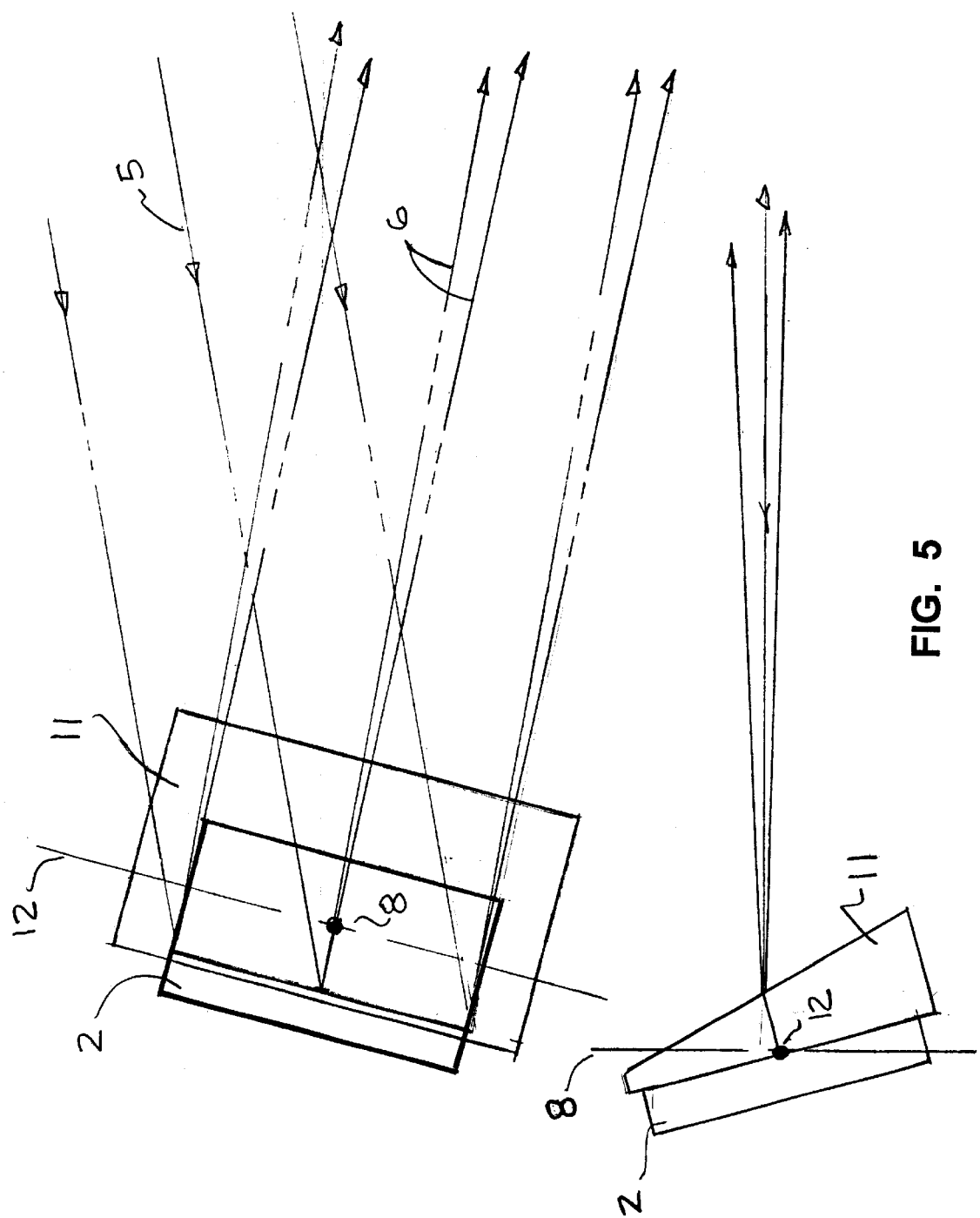
FIG. 5 is a detail of the grating and cross-dispersion prism in FIG. 4, as they might preferably be mounted in a crossed-dispersion assembly of this invention.

Details of a preferred arrangement of the grating and prism cross disperser described in FIG. 4 of this invention, are shown in FIG. 5. The grating 2 and prism 11 are mounted, with the ruled surface of the grating preferably nearly in contact with and parallel to the second optical surface of the prism, in an interchangeable crossed-dispersion assembly wherein the grating and prism are adjusted as follows:

The grating and prism are rotated as a unit about the first axis 8 to center the grating blaze direction near centerlines of area 7 and detector array 10, wherein the centerlines are both parallel to axis 8. The grating and prism are also rotated together as a unit about a second axis 12, perpendicular to and typically intersecting axis 8, to adjust the prism at the angle of minimum deviation for a particular wavelength, which causes radiation at that wavelength, as refracted by the prism, to be incident on the grating perpendicular to its grooves. After reflection and dispersion by the grating, the beam representing the minimum deviation wavelength returns through the prism and is directed towards the center of area 7, and subsequently imaged by 7 near the center of detector array 10, the detector array having preferably been rotated to make its rows and columns of pixels parallel or perpendicular respectively to axes 8 and 12.

As will be appreciated by those skilled in the art, the above preferred embodiments of this invention are examples of a variety of similar embodiments utilizing the basic features of this invention to achieve the same purposes, and as such should be understood to be implied alternatives of this embodiment for the purposes of this disclosure.

It will also be obvious to those of average skill in the art that the means for focusing, tilting, rotating and otherwise aligning the image plane to the detector array are an implied part of the preferred embodiment of this invention, and are accomplished in this disclosure by inference.

What I claim is:

1. A cross-dispersed low-blaze-angle multiorder plane grating spectrograph using a modified Ebert-type mounting comprising
    a single concave paraboloidal mirror having a focus, the mirror replacing the single spherical primary mirror of the Ebert-type mounting;
    a plane diffraction grating, the grating having equally-spaced grooves, the grating located near the focus of the paraboloidal mirror, the grating having a blaze angle, the blaze angle less than 20°;
    a cross-dispersing element, the cross-dispersing element located between the paraboloidal mirror and the grating;
    a detector array, the array containing pixels in a multiplicity of rows and a multiplicity of columns, wherein a cross-dispersed spectral image is located at the array, the spectral image containing a multiplicity of spectral orders, the orders separated from each other by the cross-dispersing element.

2. The spectrograph as defined in claim 1 wherein the cross-dispersing element is a prism, the prism having an apex, the apex perpendicular to the grating grooves.

3. The spectrograph as defined in claim 2 wherein the prism is mounted almost in contact with the grating, whereby radiation incident on and reflected from the grating passes twice through the prism.

4. The spectrograph as defined in claim 2 wherein the prism and grating are mounted together in a crossed-dispersion assembly, the crossed-dispersion assembly interchangeable with other crossed-dispersion assemblies containing a prism and a grating.

5. The spectrograph as defined in claim 2 wherein a fluid of refractive index n fills the space between the prism and the grating, whereby the blaze angle of the grating is effectively increased by a factor of n.

* * * * *